(12) United States Patent
Garrett

(10) Patent No.: US 7,367,577 B1
(45) Date of Patent: May 6, 2008

(54) MOTORCYCLE THIGH PROTECTOR

(76) Inventor: Mike Garrett, 755 W. Main St., Lake Geneva, WI (US) 53147

( * ) Notice: Subject to any disclaimer, the term of this patent is extended or adjusted under 35 U.S.C. 154(b) by 0 days.

(21) Appl. No.: 11/010,781

(22) Filed: Dec. 13, 2004

Related U.S. Application Data

(60) Provisional application No. 60/528,658, filed on Dec. 11, 2003.

(51) Int. Cl.
- *B62J 1/18* (2006.01)
- *B62J 27/00* (2006.01)
- *B62J 39/00* (2006.01)

(52) U.S. Cl. ................. 280/288.4; 280/304.3
(58) Field of Classification Search ............ 280/288.4, 280/304.3, 304.4, 748, 751; 224/32 R, 413, 224/562; 297/195.1, 195.12, 195.13, 219.11
See application file for complete search history.

(56) References Cited

U.S. PATENT DOCUMENTS

| | | | | |
|---|---|---|---|---|
| 1,431,866 | A | | 10/1922 | Bacchi |
| 3,756,623 | A | * | 9/1973 | Whittler ................. 280/304.3 |
| 3,901,549 | A | * | 8/1975 | Ramirez .................... 296/78.1 |
| 4,059,207 | A | * | 11/1977 | Jackson et al. ............. 224/413 |
| 4,068,859 | A | | 1/1978 | Dittman |
| 4,171,145 | A | * | 10/1979 | Pearson, Sr. ............... 296/78.1 |
| 4,685,530 | A | | 8/1987 | Hara |
| 5,080,431 | A | * | 1/1992 | Frazier .................. 297/184.11 |
| 5,820,200 | A | * | 10/1998 | Zubillaga et al. ...... 296/136.03 |
| 6,179,313 | B1 | | 1/2001 | Christensen |
| 6,516,844 | B1 | * | 2/2003 | Henry ........................ 150/167 |
| 6,663,128 | B2 | * | 12/2003 | Dichter .................... 280/288.4 |
| 6,854,542 | B2 | * | 2/2005 | Schoonover ............... 180/68.2 |
| 6,971,715 | B2 | * | 12/2005 | Hankins ................ 297/219.11 |

* cited by examiner

*Primary Examiner*—Lesley D. Morris
*Assistant Examiner*—Marc A. Scharich
(74) *Attorney, Agent, or Firm*—Boyle Fredrickson, S.C.

(57) ABSTRACT

An insulating motorcycle seat accessory is disclosed for use by a rider when the motorcycle will be at a standstill for a relatively long period. The accessory protects the rider's legs from becoming overheated when the motorcycle engine is not being cooled adequately.

10 Claims, 3 Drawing Sheets

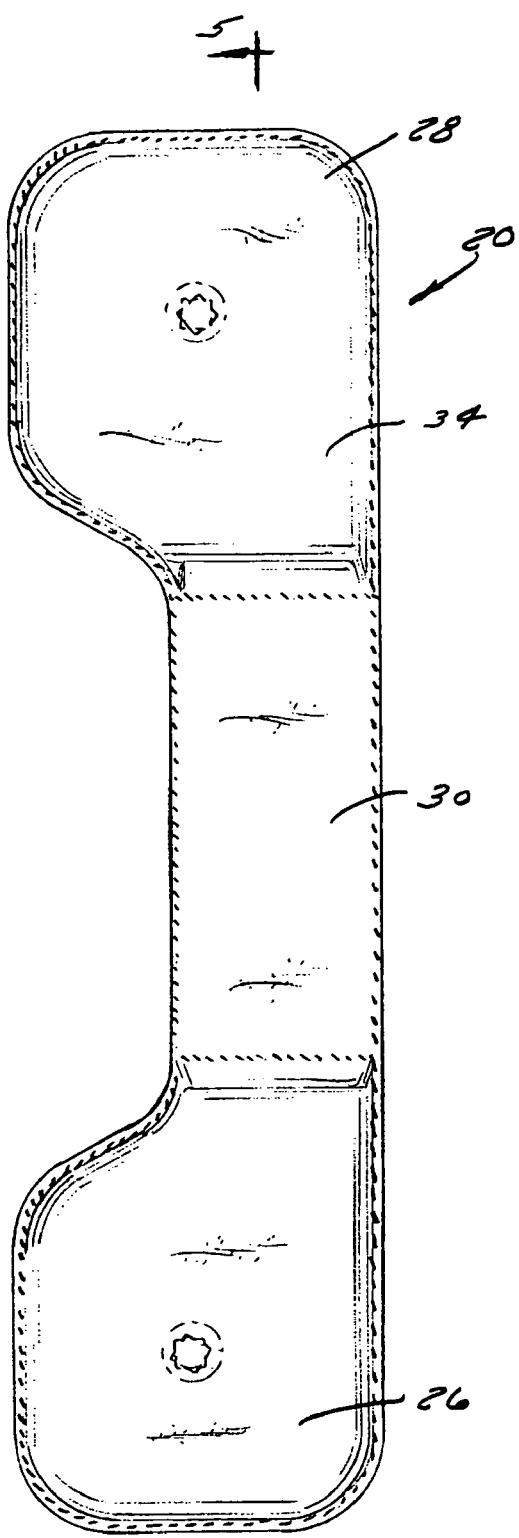
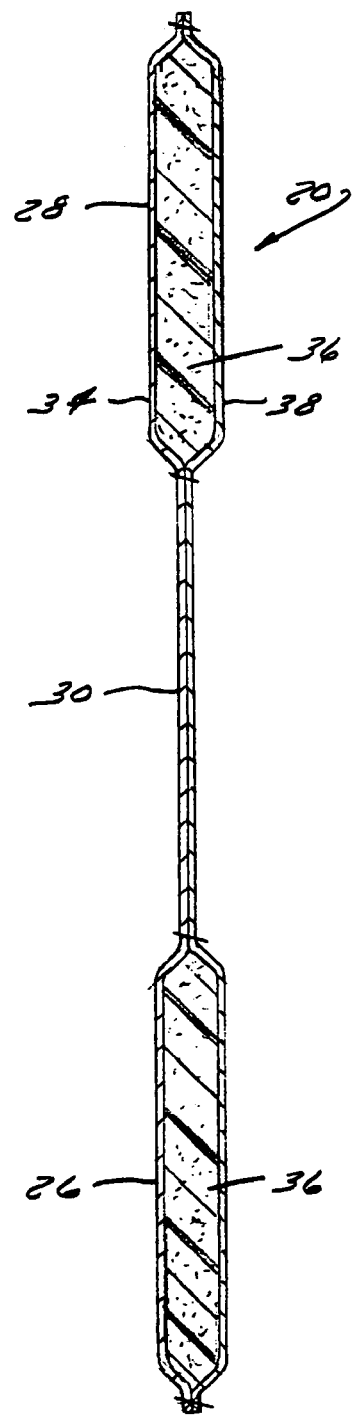
FIG. 4
FIG. 5

MOTORCYCLE THIGH PROTECTOR

CROSS-REFERENCE TO A RELATED APPLICATION

The application claims priority from U.S. Provisional Patent Application Ser. No. 60/528,658, filed on Dec. 11, 2003, the entirety of which is incorporated herein.

BACKGROUND OF THE INVENTION

1. Field of the Invention

The present invention relates to a device for use on a motorcycle, and more particularly, relates to a device that protects the motorcycle rider's legs from heat produced by the motorcycle.

2. Discussion of the Related Art

In ordinary use, the heat produced by a motorcycle is not noticeable to the rider of the motorcycle. This is because in ordinary use, i.e. driving on highways and most streets, the rider's legs are not in close proximity with the heat producing portions of the motorcycle. In addition, during ordinary use, the heated portions of the bike are cooled by air passing thereover.

However, in some situations, this is not the case. Specifically, in parades, rallies, and heavy traffic, where the rider is stopped for periods of time with the engine on, the rider's feet are touching the ground. As a result, during those time periods, the rider's legs may be adjacent a heat producing portion of the motorcycle not being cooled by air flow, and may become uncomfortably hot. Naturally, the degree of heat produced near the rider's legs is dependent on the design of the motorcycle. Nevertheless, it is known that some cycles are designed such that stop-and-go riding can overheat the inside of the rider's thighs during the stopped periods.

SUMMARY OF THE INVENTION

The present invention is a motorcycle seat accessory that protects the rider's thighs from the heat produced by the cycle for use in settings when the rider will be on the bike, with the engine running, but the bike will be at a standstill for relatively long periods of time. One preferred embodiment of the invention comprises a device having a right side and left side with a middle connection portion. The right and left sides have a top layer, middle layer, and bottom layer, while the middle connection portion has only a top layer and bottom layer. The middle layer of the right and left sides preferably comprises an insulating material.

BRIEF DESCRIPTION OF THE DRAWINGS

Preferred exemplary embodiments of the invention are illustrated in the accompanying drawings, in which like reference numerals represent like parts throughout, and in which:

FIG. 4 is a top plan view of a preferred embodiment of the device; and

FIG. 5 is a cross-sectional view of the device taken along 5-5 of FIG. 4.

DETAILED DESCRIPTION OF THE PREFERRED EMBODIMENT

Figure 1:
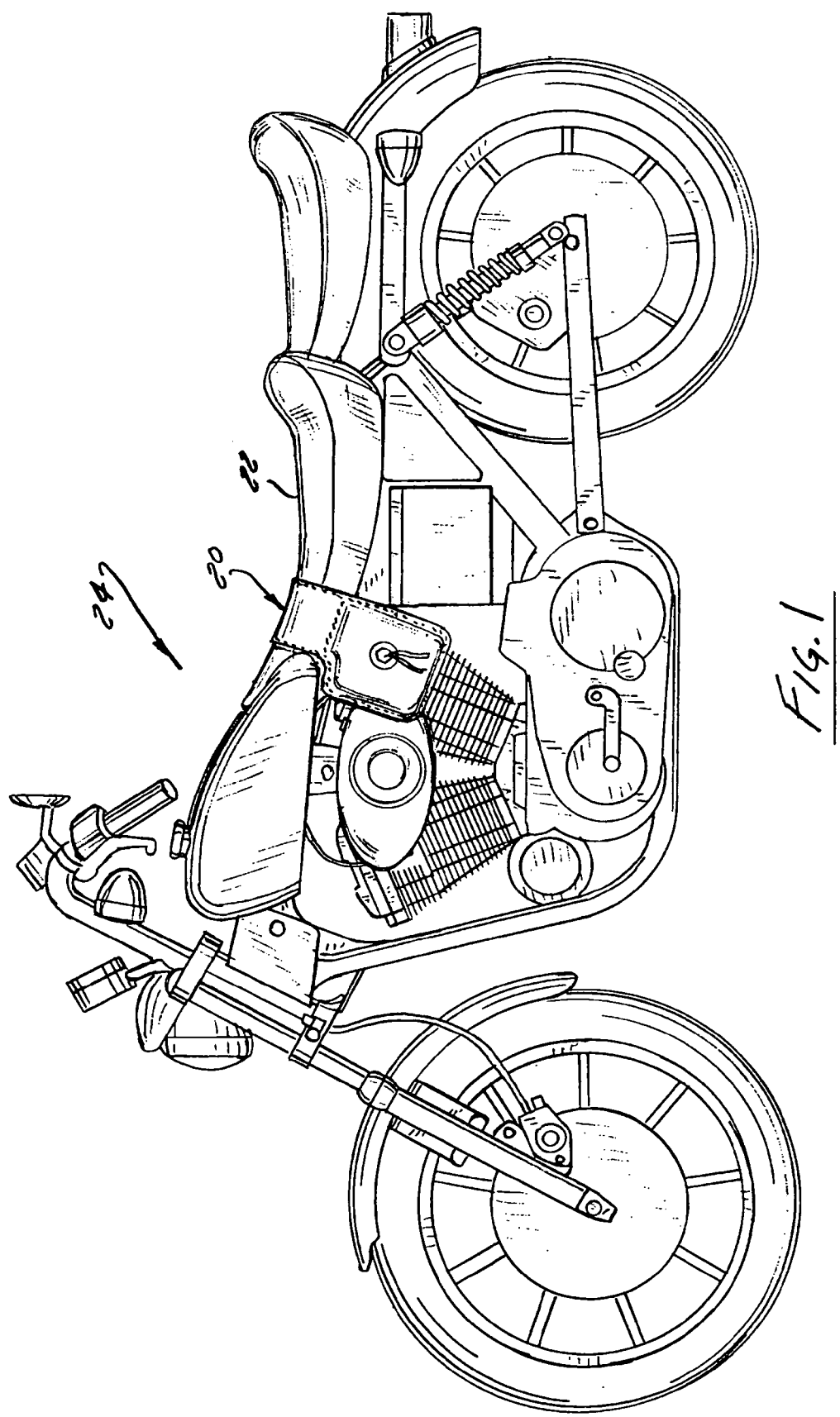
FIG. 1 shows a preferred embodiment of the device of the present invention in use on a motorcycle.
Figure 2:
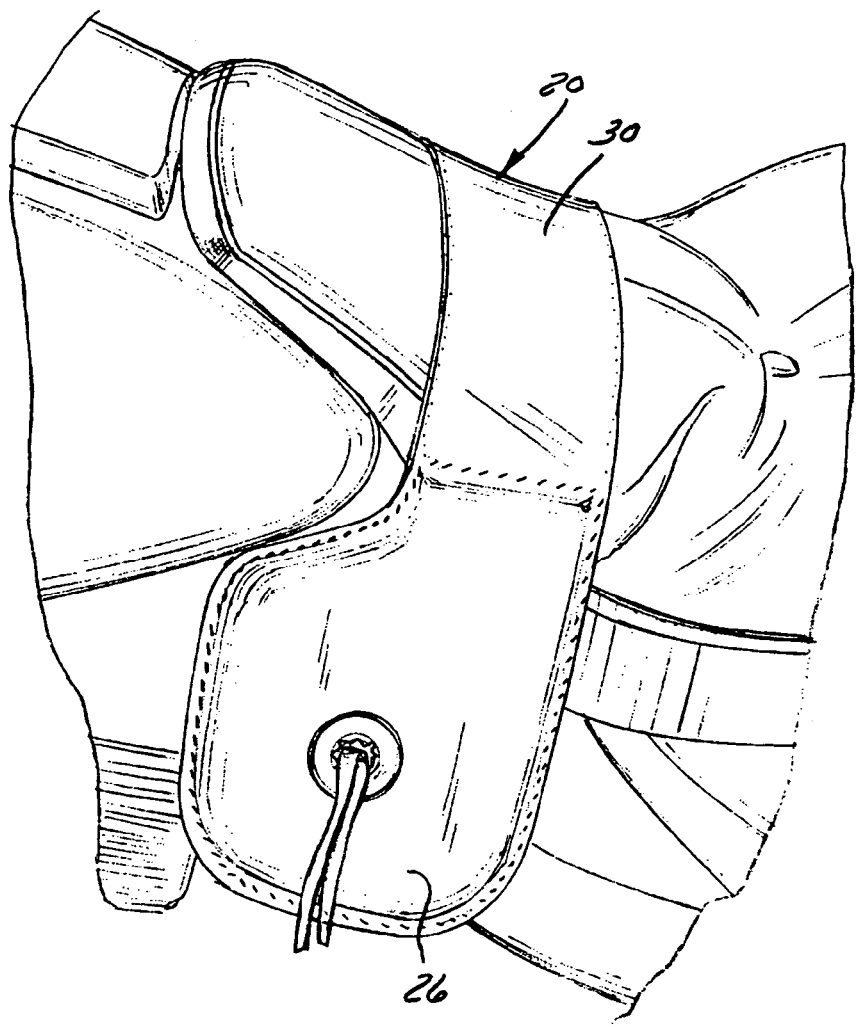
FIG. 2 is a closer view of the device as shown in FIG. 1.
Figure 3:
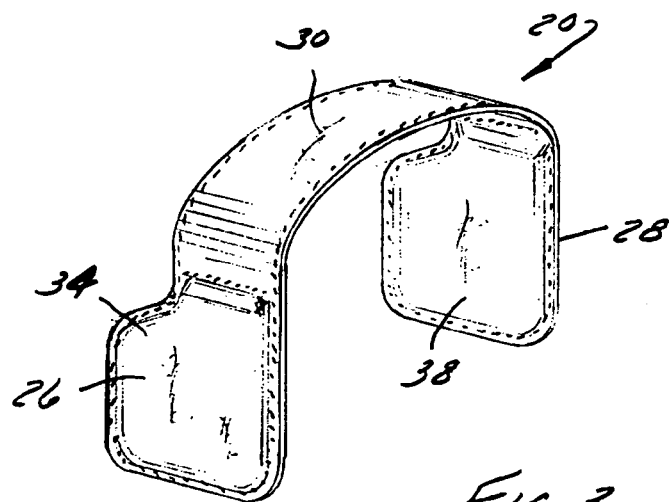
FIG. 3 is a perspective view of a preferred embodiment of the device.

As seen in FIGS. 1 and 2, the device 20 of the present invention is designed to be removably placed over the seat 22 of a motorcycle 24. As best seen in FIGS. 3 and 4, device 20 comprises a strip of material approximately 28 inches long having a padded left end or side 26 and a padded right end or side 28 each of which is about 6 inches wide. Device 20 further comprises a middle connection portion 30 that is about half as wide as ends 26, 28. Referring to FIGS. 1 and 2, it can be seen that connection portion 30 is placed over seat 22 of motorcycle 24 such that right end 28 and left end (not shown) hang on either side of cycle 24.

Referring now to FIG. 5, it can be seen that padded left end 26 and padded right end 28 comprise a top layer 34, a middle insulating layer 36, and a bottom layer 38. The top and bottom layers 34, 38 may be comprised of any suitable material. Leather is the material used in the preferred embodiment because of its durability, good looks, and coordination with other motorcycle accessories and gear, in which leather is an oft-used material. As seen in FIG. 1, top layer 34 faces outward, toward the user, while bottom layer 38 faces inward, toward motorcycle 24.

Middle layer 36 is preferably comprised of an insulating material that will prevent heat from motorcycle 24 from being reflected onto the leg of the rider. The insulation used in the preferred embodiment is a fire-retardant automotive insulation made of about 99% aluminum to reflect radiant heat at temperatures up to 700 degrees Fahrenheit. However, any suitable material may be used without departing from the spirit of the invention, so long as the rider's legs are substantially prevented from absorbing the heat of the cycle during idle periods.

In its preferred embodiment, the invention is stitched together and may have a decorative element placed on top layer 24 prior to being stitched. Naturally, any number of ways of connecting top and bottom layers 34, 38 to enclose the middle layer 36 are possible and are within the scope of the present invention. The addition of a decorative element or elements and the manner of so doing are matters of personal preference and manufacturing ease and the invention should not be considered limited to any particular decorative element or manner of introducing such an element.

It should also be noted that the design shown and described herein may be varied depending on the motorcycle for which the protector is made. For example, the design shown herein may be suitable for a particular model of Harley-Davidson cycles but may not be appropriate for other models. Even cycles having water-cooled engines can become uncomfortable under the operating conditions discussed herein, and the protector shown herein may not fit other such bikes without modification. Of course, any variety of changes can be made to the dimensions of the various parts to adapt the device for use on particular vehicles. Any modifications or design changes based on differing motorcycle configurations should therefore be considered within the scope of the present invention.

Finally, it should be obvious that modifications in the design of device 20 may be made without departing from the scope of the invention. For instance, connection portion 30 need not be comprised of top layer 34 and bottom layer 38 as shown in the drawings of the preferred embodiment, and need not even be integrally formed with top and bottom layers 34, 38 of left and right ends 26, 28. It may prove more economical, durable, or adaptable for left and right ends 26, 28 to be fully stitched around their perimeters and a single or double layer of material be stitched between the ends 26, 28 for placement over seat 22. An elasticized or rubberized material may provide better fit or grip, or a single layer of leather may prove to decrease production costs. Modifications of this type should also be considered within the scope of the invention.

I claim:

1. In combination, a motorcycle having a seat and a heat-generating component located below the seat, and a motorcycle seat accessory, the motorcycle seat accessory comprising:
   a right side portion,
   a left side portion;
   a connection portion connecting the right and left side portions, wherein the connection portion extends across the seat of the motorcycle and wherein the right and left side portions extend downwardly from the connection portion to a location below the seat such that the right and left side portions generally overlie the heat-generating component of the motorcycle, and wherein the right and left side portions are located generally between the heat-generating component of the motorcycle and legs of a rider of the motorcycle when the rider is seated on the seat; and wherein each of the right side portion and left side portion is comprised of an outward-facing layer and a heat-reflecting insulating layer.

2. The motorcycle seat accessory of claim 1, wherein the connection portion has an outward-facing layer.

3. The motorcycle seat accessory of claim 2, wherein the outward-facing layer of the connection portion is comprised of leather.

4. The motorcycle seat accessory of claim 2, wherein the outward-facing layer of the right side, left side, and connection portion are comprised of a single piece of material.

5. The motorcycle seat accessory of claim 1, wherein the outward-facing layers of the right and left side portions are comprised of leather.

6. The motorcycle seat accessory of claim 1, wherein the insulating layer is comprised of automotive insulation.

7. The motorcycle seat accessory of claim 1, wherein the insulating layer reflects radiant heat up to 700 degrees Fahrenheit.

8. A motorcycle accessory to protect a motorcycle rider's thighs from heat generated by an engine of a motorcycle comprising:
   a seat portion that extends over a seat of the motorcycle; and
   a thigh protecting portion that extends below the seat of the motorcycle at least partially covering the engine; wherein the thigh protecting portion comprises an outer layer and an insulating layer.

9. The motorcycle accessory of claim 8, wherein the insulating layer is comprised of automotive insulation.

10. The motorcycle accessory of claim 8, wherein the insulating layer reflects radiant heat up to 700 degrees Fahrenheit.

* * * * *